United States Patent
Oblinger et al.

(10) Patent No.: US 12,482,083 B2
(45) Date of Patent: Nov. 25, 2025

(54) METHOD AND DEVICE FOR MEASURING A PHYSICAL OBJECT

(71) Applicant: Fill Gesellschaft m.b.H., Gurten (AT)

(72) Inventors: Fabian Oblinger, St. Georgen bei Obernberg (AT); Nikolaus Weinberger, Wippenham (AT)

(73) Assignee: Fill Gesellschaft m.b.H., Gurten (AT)

( * ) Notice: Subject to any disclaimer, the term of this patent is extended or adjusted under 35 U.S.C. 154(b) by 429 days.

(21) Appl. No.: 17/924,433

(22) PCT Filed: May 12, 2021

(86) PCT No.: PCT/EP2021/062722
§ 371 (c)(1),
(2) Date: Nov. 10, 2022

(87) PCT Pub. No.: WO2021/228998
PCT Pub. Date: Nov. 18, 2021

(65) Prior Publication Data
US 2024/0212117 A1    Jun. 27, 2024

(30) Foreign Application Priority Data
May 14, 2020   (EP) .................................... 20174743

(51) Int. Cl.
*G01B 11/25*   (2006.01)
*G01N 35/00*   (2006.01)
(Continued)

(52) U.S. Cl.
CPC ....... *G06T 7/0002* (2013.01); *G01N 35/0099* (2013.01); *G06T 7/521* (2017.01);
(Continued)

(58) Field of Classification Search
CPC .......................... A61B 6/022; G02B 27/22–26
See application file for complete search history.

(56) References Cited

U.S. PATENT DOCUMENTS 11,954,886 B2 *   4/2024   Taamazyan .......... G06V 10/147
12,067,746 B2 *   8/2024   Taamazyan ............... G06T 7/75
(Continued)

FOREIGN PATENT DOCUMENTS

DE      102017122627 A1    3/2019
EP          2034269 A1    3/2009
(Continued)

OTHER PUBLICATIONS

A. Bellmann, O. Hellwich, V. Rodehorst and U. Yilmaz, "A Benchmarking Dataset for Performance Evaluation of Automatic Surface Reconstruction Algorithms," 2007 IEEE Conference on Computer Vision and Pattern Recognition, Minneapolis, MN, 2007, pp. 1-8, doi: 10.1109/CVPR.2007.383349. (Year: 2007).*
(Continued)

*Primary Examiner* — Stephen R Koziol
*Assistant Examiner* — Dylan J Sherrillo
(74) *Attorney, Agent, or Firm* — FisherBroyles, LLP (57) ABSTRACT

A method and a device for measuring a physical object, wherein image data of uniquely identifiable points on the object is captured from different perspectives by means of at least one camera, and a spatial position of the uniquely identifiable points are ascertained from this image data, and at least one three-dimensional point cloud of the uniquely identifiable points is created as a global map of the object. To detect a surface quality of the object, light beam bundles are reflected on a surface of the object and are captured as image data. The image data obtained from the light beam bundles reflected on the surface of the object comprises at least some of the uniquely identifiable points as well as surface regions located between the uniquely identifiable points.

20 Claims, 2 Drawing Sheets

(51) Int. Cl.
  *G06T 7/00* (2017.01)
  *G06T 7/521* (2017.01)
  *G06T 7/586* (2017.01)
  *G06T 7/73* (2017.01)

(52) U.S. Cl.
  CPC .............. *G06T 7/586* (2017.01); *G06T 7/73* (2017.01); *G06T 2207/10028* (2013.01); *G06T 2207/10152* (2013.01); *G06T 2207/20221* (2013.01); *G06T 2207/30204* (2013.01)

(56) References Cited

U.S. PATENT DOCUMENTS

2008/0201101 A1　8/2008　Hebert
2010/0134598 A1　6/2010　St-Pierre

FOREIGN PATENT DOCUMENTS

| EP | 2244484 A1 | 10/2010 | |
| EP | 2977719 A1 | 1/2016 | |
| EP | 3650807 A1 * | 5/2020 | ............. G01B 11/25 |
| WO | 2007130369 A2 | 11/2007 | |
| WO | 2010121637 A1 | 10/2010 | |
| WO | 2016071227 A1 | 5/2016 | |

OTHER PUBLICATIONS

European Search Report PCT/EP2021/062722, dated Jul. 15, 2021.

* cited by examiner

METHOD AND DEVICE FOR MEASURING A PHYSICAL OBJECT

CROSS-REFERENCE TO RELATED APPLICATIONS

This application is a National Stage Patent Application of International Patent Application No. PCT/EP2021/062722, filed May 12, 2021, which claims the benefit of European Application Serial No. 20174743.3, filed May 14, 2020, the contents of each are incorporated by reference in their entireties.

TECHNICAL FIELD

The disclosure relates to a method for measuring a physical object, wherein image data of uniquely identifiable points on the object are captured from different perspectives using at least one camera, and spatial positions of the uniquely identifiable points are ascertained from the image data, and at least one three-dimensional first point cloud of the uniquely identifiably points is generated as a global map of the object.

BACKGROUND

Furthermore, the disclosure relates to a device for measuring a physical object, wherein the device comprises at least one camera.

Relevant methods and devices are described in EP3650807A1, US2010/134598A1, EP2034269A1 as well as US2008/201101A1.

A method and a device of the aforementioned type, for example, became known from DE102017122627A1. In the known methods, positions and orientations of selected points are applied to the physical object as markings ("tracking markers"). The positions of the markings are determined photogrammetrically. Such method for photogrammetrically detecting three-dimensional objects also became known under the designation "structure from motion". Furthermore, in the known methods, the orientations, i.e. the surface normals of the markings are determined by photometrical stereo analysis.

The main disadvantage of the known solution is that a texture and/or property of the surface regions located between the individual markings is not detected and thus merely the shape of the object can be detected. However, for many applications, it is required to also know the properties of the surface as precisely as possible. Thus, it can for example be required, if measuring is carried out in the course of a quality check, to also detect small surface damage, such as scratches, holes, spots where material was removed.

OVERVIEW

Therefore, it is an object of the disclosure to overcome the shortcomings of the existing methods and to allow for a more precise detection of the object.

This object is achieved in a method of the initially mentioned type according to the disclosure in that, to detect a surface quality of the object, light beam bundles reflected on a surface of the object are captured as image data, wherein the image data obtained from the light beam bundles reflected on the surface of the object comprises at least some of the uniquely identifiable points as well as surface regions located between the uniquely identifiable points, and at least one second three-dimensional point cloud is ascertained as a local map of the object from the captured image data of the light beam bundles reflected on the surface of the object, wherein the first point cloud and the second point cloud are combined into at least one third point cloud using the uniquely identifiable points as reference points, wherein the at least one camera and at least one illuminating device, in particular all used illuminating devices, are mounted on a robot arm and are guided by it over the surface of the object at a distance therefrom.

The solution according to the disclosure allows for very precise mapping of the surface of the object. Thus, the model does not only indicate the three-dimensional shape of the object ascertained from the position of the uniquely identifiable points, but also indicates the surface quality, i.e. the surface geometry, of the object and thus allows for a precise analysis of the object.

According to an advantageous advancement of the disclosure, which allows for detection of the surface geometry of the object, at least one known pattern can be projected onto the surface of the object and superimposed thereon, wherein image data of the pattern superimposed on the surface is generated and a surface geometry of the surface is detected by means of a structured light process on the basis of deviations of the generated image data of the pattern superimposed on the object from the known pattern, wherein the image data of the light beam bundles reflected on the surface comprise the image data of the pattern superimposed on the surface section of the object.

In a particularly advantageous embodiment of the disclosure, it can be provided that the light beam bundles reflected on the surface of the object comprises image data captured at different illumination scenarios, wherein the different illumination scenarios differ at least in the direction from which the illumination is applied and hence in the shadow casting, wherein the surface quality is determined from the image data acquired under different illumination scenarios by means of photometric stereo analysis. This variant of the disclosure is particularly advantageous if it is combined with the detection of the surface geometry by a structured light process mentioned in the previous paragraph, since locations which feature particularly strong reflections in the structured light process can be additionally analyzed by means of photometrical stereo analysis. Hence, by the use of photometrical stereo analysis in combination with the structured light process, the detection preciseness can be significantly improved.

It has been found to be particularly advantageous in terms of simplifying processing and increasing processing speed and accuracy that the image data of the pattern projected onto the surface of the object and the image data captured under different illumination scenarios are each captured from multiple perspectives corresponding to the perspectives under which the uniquely identifiable points are captured to form the first point cloud, such that at least one set of image data is formed for each perspective, said set of image data comprising image data of the pattern projected on the surface and the image data captured under different illumination scenarios and the image data captured to form the first point cloud. In other words, multiple different further processed images of the object can be taken from one and the same perspective before the camera is guided on. The fact that image data used for "structure from motion", "structured light" and "photometrical stereo analysis" are captured from one common perspective entails the advantage that a comparison of this data is facilitated since this image data is captured from the same relative position in relation to the object and information obtained from this data can be put into direct relation with one another. Moreover, it is particularly advantageous that fluctuations in preciseness in the detection of the pose and position of the robot arm have only a minor and/or negligible influence in the reconstruction of the physical object.

In the aforementioned context, it has also proven advantageous that the image data of the image of the known pattern projected onto the surface of the object, and the image data of the uniquely identifiable points for forming the first point cloud, as well as the image data captured at different illumination scenarios, are captured with the same camera. By this variant of the disclosure, moreover, the amount of hardware required can be significantly reduced, since additional sensors, for example a sensor for detecting structured light, can be dispensed with.

A variant of the disclosure, in which the image data of the light beam bundles reflected on the surface sections comprises image data generated with a light field camera, wherein the surface quality can be determined from the image data generated with the light field camera, has proven particularly advantageous. The use of a light field camera allows for simultaneous detection of a surface geometry, i.e. a surface structure and/or surface quality, of the object and of the points required for the determination of the contour outline of the object. Light field cameras, also referred to as plenoptic cameras, allow for a three-dimensional representation of objects. Such cameras are known to the person skilled in the art, for example from WO 2010/121637 A1 and EP 2244484 B1, in which the parameters to be taken into account in the design of such cameras are also explained in more detail.

According to another advancement of the disclosure, which is also very advantageous, it can be provided that tracking markers are applied onto the surface of the object and the uniquely identifiable points are formed by these tracking markers. The tracking markers can, for example, be circular markers of paper with a black edge and a bright center. In principle, however, all other types of tracking markers (shape, pattern and material) can also be used. For photogrammetric measurement, however, it is advantageous if the center of the tracking marker is marked or can be determined unambiguously. For example, the center of the tracking marker can be formed as a circle in order to allow for the center to be found with subpixel accuracy. A gray code can be arranged around the center of the tracking marker in order to be able to uniquely identify the tracking marker. In addition, a tracking marker with a special color marking has become known from WO 2016/071227 A1. This tracking marker has a color spectrum with different color values. The color values differ in a sinusoidal pattern along an elliptical path around the center of the optical marker. This color pattern can also be used to determine the pose of the optical marker very precisely.

Instead of being physical markers, the tracking markers can also be supplemented or replaced by projected light patterns on the object. In this variant, there is a projector or multiple static projectors in the room, which project a pattern (points, lines, etc.) onto the object to be reconstructed. The spatial relationship between the projected points and the object does not change during the reconstruction phase. With the aid of this variant, uniquely identifiable points can be defined on objects with homogeneous surface structures without having to place physical markers on the object and remove them again afterwards.

A combination of projected and physical markers is to be preferred, wherein the physical markers are predominantly statically fixed in the scene around the component to be checked and the projected features are mainly limited to the object to be checked. Referencing of the object to markers fixed in the environment is advantageously carried out via a receiving/holding device for the object. Geometric features on the component that are used for referencing thus enable particularly precise re-clamping of components. They are also advantageous for matching with ideal CAD data of the object. For this purpose, the object must be fixed without deformation and/or with little deformation. However, it is not precluded that particularly flexible components are brought into shape by the fixation in order to reproduce, for example, a later component installation situation. The fixation in installation orientation such that occurring deformations due to gravity, for example, are also included, is particularly advantageous.

By placing the system on a robot, components of different dimensions can be detected and reconstructed fully automatically in detail and with a very high information content. Likewise, the number of perspectives and their achievability with an industrial robot comprising at least 6 axes is advantageous. By the enlargement of the working space by means of an additional linear axis, 7th axis on the robot base, the number of possible orientations and positions of the robot arm is higher and thus the limitation by collisions of component and robot structure can be circumvented.

It is particularly advantageous for the robot base to be mounted on a mobile platform. Hence, it is possible to freely displace the system between components and clamping operations and the system can be used universally. Likewise, mounting on a tripod for easy change of position of the robot platform or system is also conceivable.

In another advantageous embodiment of the system, the component comprises one or multiple motion axes, for example an axis of rotation and/or a linear motion axis. It is particularly advantageous if this motion axis can be controlled relative to the system via an industrial controller. Furthermore, it is advantageous if the projectors projecting the patterns onto the component can be moved or the position of the projection can be controlled.

The aforementioned object can also be achieved by a device of the initially mentioned type according to the disclosure in that the device comprises at least one camera and an illuminating device having multiple illuminating segments which can be activated separately and simultaneously, wherein the illuminating segments form a frame, wherein the individual illuminating segments are arranged around a central opening of the frame, wherein the device comprises at least one controller, which is configured to ascertain a model of at least the shape and surface quality of the physical object from the image data of the surface of the physical object generated by the camera, wherein the device comprises a robot arm and the camera and the illuminating device are arranged on the robot arm, wherein if the device comprises a projector for generating a pattern on the surface of the object, said projector is preferably also arranged on the robot arm.

By the ring-shaped and/or frame-shaped multi segment illumination, illumination scenarios required for the detection of the image data can be realized while the object is measured. Hence, for example, the optimum illumination scenarios can be generated for capturing image data used for a structure from motion method as well as for capturing image data used for a photometric stereo analysis. In particular, selectively switching on segments of the illumination in the course of capturing image data used for a photometric stereo analysis enables the creation of different shadow casts without having to change the position of the camera or illumination source.

According to another advantageous advancement of the disclosure, it may be provided that the device further comprises a projector for generating a pattern, in particular a stripe-shaped pattern, on the physical object. This variant of the disclosure is particularly suitable for the use of a structured light process for measuring the surface of the object.

With regard to a simple and particularly precise detection of the object, a variant of the disclosure in which the at least one camera is a light field camera has proven to be particularly advantageous.

According to another preferred variant of the disclosure, it can be provided that the device is configured to capture image data of uniquely identifiable points, in particular tracking markers, on the object from different perspectives by means of the at least one camera, and to determined spatial positions of the uniquely identifiable points from the image data as well as to determine a three-dimensional first point cloud of the uniquely identifiable points as a global map of the object, as well as to detect light beam bundles reflected on a surface of the object as image data for detecting a surface quality of the object, wherein the image data obtained from light beam bundles reflected on the surface of the object comprise at least some of the uniquely identifiable points as well as surface regions located between the uniquely identifiable points, and to ascertain a second, three-dimensional point cloud as a local map of the object from the captured image data of the light beam bundles reflected on the surface of the object, as well as to combine the first point cloud and the second point cloud to a third point cloud using the uniquely identifiable points as reference points.

Advantageously, the device can be configured to project at least one known pattern onto the surface of the object and to superimpose it thereon, as well as to generate image data of the pattern superimposed on the surface and to detect a surface geometry of the surface by means of a structured light process on the basis of deviations of the generated image data of the pattern superimposed on the object from the known pattern, wherein the image data of the light beam bundles reflected on the surface comprise the image data of the pattern superimposed on the surface section of the object.

Furthermore, it can be provided that the image data of the light beam bundles reflected on the surface of the object comprise image data captured at different illumination scenarios, wherein the different illumination scenarios differ at least in the direction from which the illumination is applied and hence in the shadow casting, wherein the device is configured to determine the surface quality the from the image data acquired under different illumination scenarios by means of photometric stereo analysis.

BRIEF DESCRIPTION OF THE DRAWINGS

The improvements including further advantages will be elucidated in further detail below by means of some non-limiting exemplary embodiments, which are shown in the drawings. These schematically show.

DETAILED DESCRIPTION

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
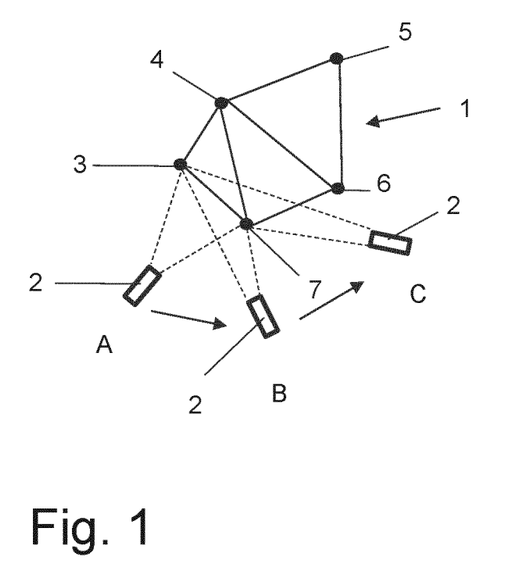
FIG. 1 a device for carrying out the method according to the disclosure.

According to FIG. 1, a camera 2 is used for measuring a physical object 1 in a method according to the disclosure. This camera can, for example, be a digital 2D camera or a light field camera. Image data of uniquely identifiable points 3, 4, 5, 6, 7 which are located on the object 1 is captured by the camera 2 from different perspectives A, B, C. In other words, digital images of the identifiable points can be captured from spatially and temporally different positions.

The uniquely identifiable points 3, 4, 5, 6, 7 can be particularly distinctive locations on the object 1 and/or tracking markers and/or points projected statically onto the object 1 as uniquely identifiable features, which are applied to the object 1 before it is measured.

Figure 2:
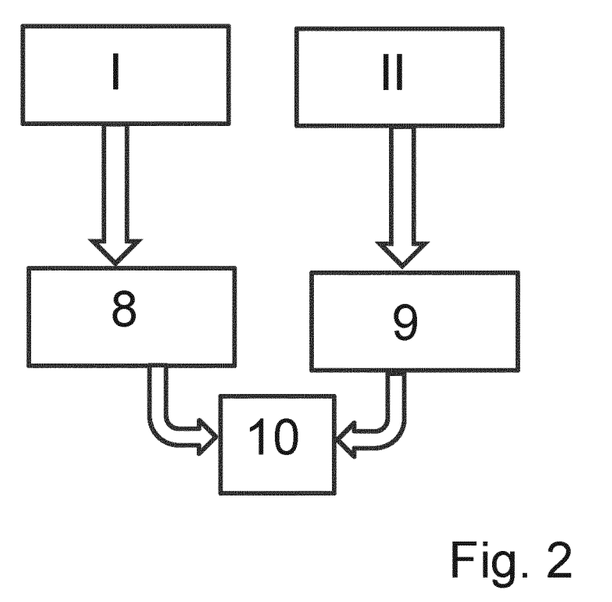
FIG. 2 a flow chart of a first variant of the method according to the disclosure.

According to FIG. 2, in a step referred to as I, spatial positions of the uniquely identifiable points 3, 4, 5, 6, 7 are ascertained from the image data of the uniquely identifiable points 3, 4, 5, 6, 7 are determined, preferably by a structure from motion process, and a three-dimensional first point cloud 8 of the uniquely identifiable points 3, 4, 5, 6, 7 is created therefrom as a global map of the object 1.

To detect a surface quality of the object 1, moreover, light beam bundles reflected on a surface of the object 1 are also detected as image data. The image data obtained from the light beam bundles reflected on the surface of the object comprises at least some of the uniquely identifiable points 3, 4, 5, 6, 7 as well as surface regions of the object located between the uniquely identifiable points 3, 4, 5, 6, 7.

According to FIG. 2, in a step referred to as II, a second, three-dimensional point cloud 9 is ascertained from the captured image data of the light beam bundles reflected on the surface of the object as a local map of the object. The first point cloud 8 and the second point cloud 9 are combined to a third point cloud 10, which represents a dense point cloud of the object 1 and thus a more precise reconstruction of the object 1, using uniquely identifiable points as reference points. In this regard, the positions of the uniquely identifiable points 3, 4, 5, 6, 7 contained in the point cloud 9 can be compared to the positions of the uniquely identifiable points 3, 4, 5, 6, 7 contained in the point cloud 8 and the point clouds 8 and 9 can be combined precisely.

In step II, for example, a known pattern can be projected onto the surface of the object 1 and superimposed on it. The pattern superimposed on the surface can be captured by the camera 2. Based on deviations of the image data of the pattern superimposed on the object generated by the camera 2 from the known pattern, a surface structure of the surface can be detected using a structured light method (fringe light method). Here, the known pattern serves as a reference pattern, and the pattern projected on the surface of the object 1 and disturbed by surface structures is evaluated based on the reference pattern. In this regard, the image data of the light beam bundles reflected on the surface comprises the image data of the pattern superimposed on the surface section of the object. In other words, the image data used to create the point cloud 9 comprises the image data of the pattern projected on the surface captured by the camera 2.

Figure 3:
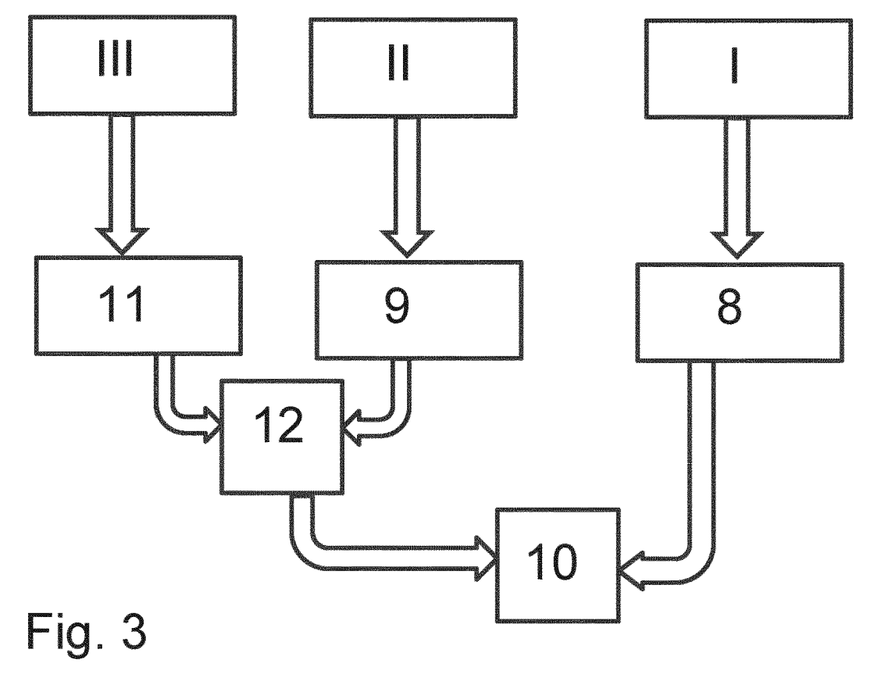
FIG. 3 a flow chart of a second variant of the method according to the disclosure.

According to FIG. 3, the image data of the light beam bundles reflected on the surface of the object 1 may comprise image data captured under different illumination scenarios. The different illumination scenarios differ at least in the direction from which the illumination of the surface of the object 1 is applied and thus in shadow casting. In a step referred to as III in FIG. 3, the surface quality can be determined from the image data captured under different illumination scenarios by means of photometric stereo analysis. Using the reflectance behavior from different illumination directions, the surface can be analyzed in more detail by calculating surface normals. Defects such as scratches, pressure marks, etc. are clearly revealed. This process can be used to refine, enhance or correct imperfections in the 3D image taken in step II. The method performed in step III does not have to be applied to the entire object 1 but can be limited to particularly critical areas on the object 1. In step III, a point cloud 11 is created, which can also be limited to only a small part of the surface. This is particularly advantageous if the 3D detection of the surface structure performed in step II is faulty at certain points. This may be caused, for example, by excessive reflections on the object 1, which may cause saturation of the camera 2, resulting in no usable image data at these locations. Of course, step III can also be applied to the entire surface of the object 1. In step III, a 3D point cloud 11 is also created from the image data used there. The point clouds 9 and 11 are then combined to form the point cloud 12. The point cloud 12 and the point cloud 8 are then used to create the dense point cloud 10, which contains all the data on the object 1.

At this point, it should also be noted that the order in which the steps are performed can be arbitrary. Thus, any of the steps I-III can be performed as the first, second or third of these steps.

The image data of the pattern projected onto the surface of the object and the image data captured at different illumination scenarios can each be captured from multiple perspectives. In this regard, it is advantageous for each of these perspectives to correspond to one of the perspectives A, B, C under which the uniquely identifiable points 3, 4, 5, 6, 7 are captured to form the first point cloud 8. Hence, for each perspective A, B, C, at least one complete set of image data can be formed which comprises the image data required for processing. Moreover, only one camera 2 can be used to perform the method and all image data can be captured with it.

It should also be noted that the image data used in the above steps I, II, III can be identical or different. Thus, for each of the steps I-III, separate images can be taken with the camera 2, the image data of which are then used for the respective step. This is particularly advantageous in combination with a 2D camera.

However, if a light field camera is used as the camera 2, the same images, i.e., the same image data, that are used to perform step I can also be used to determine the surface quality, since the three-dimensional structure of the surface can be directly extracted from the image data captured with the light field camera.

Figure 4:
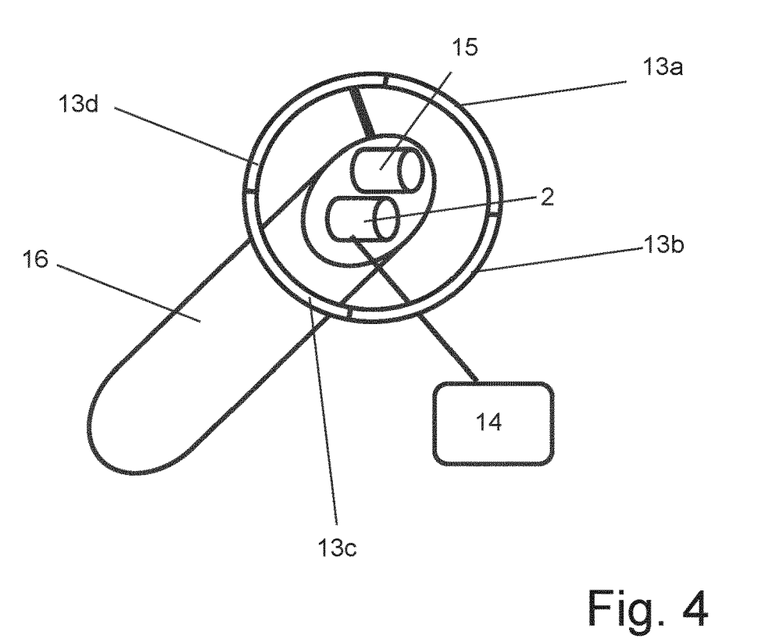
FIG. 4 the device of FIG. 1 in closer detail.

According to FIG. 4, a device 17 for carrying out the method according to the disclosure, in addition to the camera 2, which can be embodied, for example, as a 2D camera or as a light field camera or plenoptical camera, comprises an illuminating device 13 divided into a plurality of illuminating segments 13*a*, 13*b*, 13*c*, 13*d* which can be activated separately from one another and simultaneously. The illuminating segments 13*a*, 13*b*, 13*c*, 13*d* form a frame, wherein the individual illuminating segments 13*a*, 13*b*, 13*c*, 13*d* are arranged around a central opening and/or empty space of the frame.

Furthermore, the device 17 comprises at least one controller 14 which is configured to ascertain a model at least of the shape and surface quality of the physical object 1 from image data generated by the camera 2 of the surface of the physical object 1. The controller 14 may, for example, be a correspondingly programmed processor, in particular a microprocessor or signal processor.

Likewise, the controller 14 can be set up to control an actuator to move the physical object 1 and the projector 15. In this regard, the object 1 and/or a holder of the object may be moved relative to the camera 2 and/or to a fixed workspace.

Further, the device 17 may comprise a projector 15, for example a structured light projector, for generating the pattern, in particular a stripe-shaped pattern, on the physical object 1. The projector 15 may be, for example, a projector known as "Wenglor MLBS201".

Also, the camera 2 and the illumination source 13, in particular all the illumination sources used, as well as the projector 15 may be mounted on a robot arm 16 and guided by it at a distance from the object 1 over its surface for capturing the image data.

A robot controller not shown here may be provided for controlling the robot arm 16 during the capturing of the image data. The robot controller may also be a correspondingly programmed processor, in particular a microprocessor or signal processor. The robot controller can be pre-programmed according to the motion sequence of the robot arm 16. According to a variant of the disclosure, the robot controller and a camera controller for controlling the capturing function of the camera 2 can communicate with each other and exchange data, such that a fully automated process sequence of the method according to the disclosure is possible. Also, additional movements of the physical object 1 can be performed via additional axes of movement by the robot controller. Modern robot controllers have additional interfaces for controlling additional functions.

For example, the robot controller can move the robot arm 16 from a current position to a new position after it receives a signal from the camera controller that all the required image data has been captured at the current position. The camera controller can also be embodied as a correspondingly programmed processor, in particular as a signal processor or microprocessor.

Of course, the camera controller and/or its function can also be integrated into the robot controller. Alternatively or in addition to the use of a robot controller, the robot arm 16 can also be remotely controlled manually, for example, by means of an appropriate control means, such as a joystick, tablet, computer keyboard, touch screen, mouse, input pen, etc.

The device 12 is configured to capture image data of the uniquely identifiable points 3, 4, 5, 6, 7 from different perspectives A, B, C by means of the camera 2 and to ascertain spatial positions of the uniquely identifiable points 3, 4, 5, 6, 7 from this image data and to create the three-dimensional point cloud 8 of the uniquely identifiable points 3, 4, 5, 6, 7 as a global map of the object 1. These, as well as all other steps for processing the image data in carrying out the method according to the disclosure, may be performed by the controller 14. Furthermore, the device 12 may be configured to acquire the light beam bundles reflected on the surface of the object 1 as image data and to ascertain the point cloud 9 as a local map of the object from the acquired image data of the light beam bundles reflected on the surface of the object 1. The controller 14 may further be arranged to combine the first point cloud 8 and the second point cloud 9 into the third point cloud 10 using the uniquely identifiable points as reference points.

In the following, the method according to the disclosure using the device 12 will be further explained by means of a further example.

In step I, the camera 2, for example in the form of a 2D camera, can be used in combination with the illuminating device 13 designed as a ring illumination. All segments 13a-13d of the illuminating device 13 are switched on to illuminate the object 1 to be reconstructed and its surroundings. The robot arm 16 moves the camera 2 to different positions and orientations around the target object for image capturing. It is important that both the object 1 and multiple ones of the uniquely identifiable points 3-7 are visible in the captured images. The 3D point cloud 8 of the placed tracking markers and/or points 3-7 is then generated from these images using the structure from motion algorithm. The result is a point cloud containing the uniquely identifiable points 3-7 of the object 1 which is looked at. The preciseness of the 3D points in space can be in the range of 0.1 mm, depending on the hardware used (even for components with a size of multiple meters). For example, the camera 2 used may be the camera known as the Dalsa Genie Nano XL5100. This point cloud 8 is considered as a global map of the object and its surroundings. It should be noted that this method reconstructs only the individual points 3-7 and not a dense point cloud of the object 1. Non-structured, homogeneous surfaces can only be reconstructed with this method used in step I with the aid of distinctive, uniquely identifiable points such as physical markers or statically projected light patterns.

At this point, it should also be noted that in order to carry out the method according to the disclosure, it is advantageous for it to be carried out under defined lighting conditions. For example, the procedure can be carried out in a dark room or in a room that is always illuminated in the same way.

In step II, the projector 15 and the camera 2 are now used in combination to capture dense point clouds 9 of partial regions of the object at different positions. This is done using the structured light principle. In this regard, both homogeneous and structured surfaces can be reconstructed. The illuminating device 13 can be switched off during step II. The partial views are then assembled using the global map already created via structure from motion. Each structured light image is considered as a local map, which contains partial regions of the global map. By locating this partial region in the global map, all structured light images can be registered in the global map. This allows a highly accurate merging of all structured light images into a single consistent 3D point cloud. Importantly, multiple tracking markers/unique points 3-7 are visible per reconstruction with camera 2, which are retrievable in the global map. The result of this step is a dense and highly accurate point cloud of object 1. The point cloud may also contain additional metadata. For example, the individual points in the point cloud may also contain metadata such as perspective, exposure, etc.

In step III, the switchable illuminating device 13 is used in combination with the camera 2 to determine surface qualities more precisely using photometric stereo. Here, the individual segments 13a-13d are actuated individually such that, for example, only one of the segments 13a-13d is illuminated at a time. For each of these different illumination scenarios, an image is captured by means of the camera 2. Hence, image data is obtained for the different illumination scenarios. Using the reflectance behavior from the different illumination directions, the surface can be analyzed in more detail by calculating surface normals. Defects such as scratches, pressure marks, etc. are clearly revealed. This process can be used to refine, enhance or correct imperfections in the 3D image. This method according to step III does not have to be applied to the entire object 1 but can be limited to particularly critical areas on the object 1.

Lastly, when all data and/or point clouds 8, 9, 11 and/or 12 are combined, a 3D reconstruction of the object 1 is obtained. Depending on the hardware, the preciseness of the reconstruction can be in a range of 0.1 mm. This reconstruction can be used in further steps for a CAD comparison, for a component analysis or for subsequent processing steps.

For the sake of good order, it is finally pointed out that, for improved understanding of the construction of the device, the latter or the constituent parts thereof have in part been illustrated not to scale and/or on an enlarged scale and/or on a smaller scale.

LIST OF REFERENCE NUMBERS

1 Object
2 Camera
3 Point
4 Point
5 Point
6 Point
7 Point
8 Point cloud
9 Point cloud
10 Point cloud
11 Point cloud
12 Point cloud
13 Illuminating device
14 Controller
15 Projector
16 Robot arm

The invention claimed is:

1. A method for measuring a physical object, wherein image data of uniquely identifiable points on the object is captured from different perspectives by at least one camera and spatial positions of the uniquely identifiable points are ascertained from the image data, and at least one three-dimensional point cloud of the uniquely identifiable points is created as a global map of the object, characterized in that, to detect a surface quality of the object, light beam bundles reflected on a surface of the object are captured as image data, wherein the image data obtained from the light beam bundles reflected on the surface of the object comprises at least some of the uniquely identifiable points as well as surface regions located between the uniquely identifiable points, and at least one second three-dimensional point cloud is ascertained as a local map of the object from the captured image data of the light beam bundles reflected on the surface of the object, wherein the first point cloud and the second point cloud are combined into at least one third point cloud using the uniquely identifiable points as reference points, wherein a robot controller may be provided for controlling a robot arm during capturing of the image data, and wherein the robot controller can move the robot arm from a current position to a new position after it receives a signal from a camera controller that all required image data has been captured at a current position.

2. The method according to claim 1, characterized in that at least one known pattern is projected onto the surface of the object and is superimposed thereon, wherein image data of the pattern superimposed on the surface is generated and a surface structure of the surface is detected by means of a structured light process on the basis of deviations of the generated image data of the pattern superimposed on the object from the known pattern, wherein the image data of the light beam bundles reflected on the surface comprise the image data of the pattern superimposed on the surface section of the object.

3. The method according to claim 1, characterized in that the image data of the light beam bundles reflected on the surface of the object comprises image data captured at different illumination scenarios, wherein the different illumination scenarios differ at least in the direction from which the illumination is applied, wherein the surface quality is determined from the image data acquired under different illumination scenarios by means of photometric stereo analysis.

4. The method according to claim 3, wherein the image data of the pattern projected onto the surface of the object and the image data captured under different illumination scenarios are each captured from multiple perspectives corresponding to the perspectives under which the uniquely identifiable points are captured to form the first point cloud, such that at least one set of image data is formed for each perspective, said set of image data comprising image data of the pattern projected on the surface and the image data captured under different illumination scenarios and the image data captured to form the first point cloud.

5. The method according to claim 3, wherein the image data of the image of the known pattern projected onto the surface of the object, and the image data of the uniquely identifiable points for forming the first point cloud, as well as the image data captured at different illumination scenarios, are captured with the same camera.

6. The method according to claim 1, wherein the image data of the light beam bundles reflected on the surface sections comprises image data generated with a light field camera, wherein the surface quality can be determined from the image data generated with the light field camera.

7. The method according to claim 1, characterized in that tracking markers are applied or projected onto the surface of the object and the uniquely identifiable points are formed by these tracking markers.

8. The method according to claim 1, characterized in that the at least one camera and the at least one illuminating source, are mounted on a robot arm and are guided by said robot arm at a distance from the object over its surface.

9. A device for measuring a physical object,
wherein the device comprises at least one camera, and an illuminating device having multiple illuminating segments which can be activated separately and simultaneously,
wherein the illuminating segments form a frame,
wherein the individual illuminating segments are arranged around a central opening of the frame,
wherein the device comprises at least one controller, which is configured to ascertain a model of at least the shape and a surface quality of the physical object from the image data of the surface of the physical object generated by the camera,
wherein a robot controller may be provided for controlling a robot arm during capturing of the image data, and
wherein the robot controller can move the robot arm from a current position to a new position after it receives a signal from a camera controller that all required image data has been captured at a current position.

10. The device according to claim 9, further including a projector for generating a pattern, on the physical object.

11. The device according to claim 9, wherein the at least one camera is a light field camera.

12. The device according to claim 9 wherein the device is configured to capture image data of uniquely identifiable points, in particular tracking markers or projected light patterns, on the object from different perspectives by means of the at least one camera, and to determined spatial positions of the uniquely identifiable points from the image data as well as to determine a three-dimensional first point cloud of the uniquely identifiable points as a global map of the object, as well as to detect light beam bundles reflected on a surface of the object as image data for detecting a surface quality of the object, wherein the image data obtained from light beam bundles reflected on the surface of the object comprise at least some of the uniquely identifiable points as well as surface regions located between the uniquely identifiable points, and to ascertain a second, three-dimensional point cloud as a local map of the object from the captured image data of the light beam bundles reflected on the surface of the object, as well as to combine the first point cloud and the second point cloud to a third point cloud using the uniquely identifiable points as reference points.

13. The device according to claim 12, wherein the device is configured to project at least one known pattern onto the surface of the object by the projector and to superimpose it thereon, as well as to generate image data of the pattern superimposed on the surface by the camera and to detect a surface geometry of the surface by means of a structured light process on the basis of deviations of the generated image data of the pattern superimposed on the object from the known pattern, wherein the image data of the light beam bundles reflected on the surface comprise the image data of the pattern superimposed on the surface section of the object.

14. The device according to claim 12, wherein the image data of the light beam bundles reflected on the surface of the object comprise image data captured at different illumination scenarios, wherein the different illumination scenarios differ at least in the direction from which the illumination is applied, wherein the device is configured to determine the surface quality the from the image data acquired under different illumination scenarios by means of photometric stereo analysis.

15. The device according to claim 9 wherein the camera and an illuminating device are arranged on the robot arm, wherein if the device comprises a projector for generating a pattern on the surface of the object, said projector is preferably also arranged on the robot arm.

16. A method for measuring a physical object, comprising:
image data of uniquely identifiable points on the object is captured from different perspectives by means of at least one camera;
spatial positions of the uniquely identifiable points are ascertained from the image data;
at least one three-dimensional point cloud of the uniquely identifiable points is created as a global map of the object; and to detect a surface quality of the object, light beam bundles reflected on a surface of the object are captured as image data;

wherein the image data obtained from the light beam bundles reflected on the surface of the object comprises at least some of the uniquely identifiable points as well as surface regions located between the uniquely identifiable points, wherein a robot controller may be provided for controlling a robot arm during capturing of the image data, and wherein the robot controller can move the robot arm from a current position to a new position after it receives a signal from a camera controller that all required image data has been captured at a current position.

17. The method for measuring a physical object as claimed in claim 16, wherein a second three-dimensional point cloud is ascertained as a local map of the object from the captured image data of the light beam bundles reflected on the surface of the object.

18. The method for measuring a physical object as claimed in claim 16, wherein the at least one three-dimensional point cloud and a second three-dimensional point cloud are combined into a third point cloud using the uniquely identifiable points as reference points.

19. The method for measuring a physical object as claimed in claim 16, wherein the at least one camera and at least one illuminating device, are mounted on a robot arm and are guided by it over the surface of the object.

20. The method for measuring a physical object as claimed in claim 16, further comprising at least one controller that is configured to ascertain a model of at least the shape and a surface quality of the physical object from the image data of the surface of the physical object generated by the camera.

* * * * *